United States Patent
Biesemann et al.

(12) 
(10) Patent No.: US 11,366,737 B2
(45) Date of Patent: Jun. 21, 2022

(54) MACHINE LEARNING PROCESS TO ENHANCE USER EXPERIENCE

(71) Applicant: SAP SE, Walldorf (DE)

(72) Inventors: Thomas Biesemann, Bruchsal (DE); Tim Kornmann, Weisloch (DE)

(73) Assignee: SAP SE, Walldorf (DE)

( * ) Notice: Subject to any disclaimer, the term of this patent is extended or adjusted under 35 U.S.C. 154(b) by 366 days.

(21) Appl. No.: 16/416,800

(22) Filed: May 20, 2019

(65) Prior Publication Data
US 2020/0371894 A1 Nov. 26, 2020

(51) Int. Cl.
*G06F 11/34* (2006.01)
*G06Q 10/06* (2012.01)
*G06N 20/00* (2019.01)
*G06F 40/174* (2020.01)

(52) U.S. Cl.
CPC ........ *G06F 11/3438* (2013.01); *G06F 40/174* (2020.01); *G06N 20/00* (2019.01); *G06Q 10/06312* (2013.01); *G06Q 10/06315* (2013.01)

(58) Field of Classification Search
CPC ...................................................... G06F 9/453
See application file for complete search history.

(56) References Cited

U.S. PATENT DOCUMENTS

| | | | |
|---|---|---|---|
| 9,117,178 B1 * | 8/2015 | Chiu | G06Q 10/00 |
| 10,726,095 B1 * | 7/2020 | Pallemulle | G06F 16/9535 |
| 2011/0282964 A1 * | 11/2011 | Krishnaswamy | G06Q 30/02 709/217 |
| 2015/0312407 A1 * | 10/2015 | Hegde | H04M 3/42042 379/142.1 |
| 2018/0240546 A1 * | 8/2018 | Pfeiffer | H04W 12/06 |

* cited by examiner

*Primary Examiner* — Di Xiao
(74) *Attorney, Agent, or Firm* — Buckley, Maschoff & Talwalkar LLC (57) ABSTRACT

Briefly, embodiments of a system, method, and article for receiving data from one or more clients, where the data indicates user interactions with one or more user interfaces (UIs) of an application. The data may be analyzed with machine learning to identify how users of the one or more clients interact with the UIs of the application. One or more parameters may be generated based, at least in part, on the identification of how the users of the one or more clients interact with the UIs of the application. One or more objects of the application may be modified based, at least in part, on the parameters to reduce user interactions with the one or more UIs.

20 Claims, 6 Drawing Sheets

MACHINE LEARNING PROCESS TO ENHANCE USER EXPERIENCE

BACKGROUND

Machine learning is the scientific study of algorithms and statistical models that computer systems use to effectively perform a specific task without using explicit instructions, instead relying on patterns and inference. Machine learning algorithms use computational methods to "learn" information directly from data without relying on a predetermined equation as a model. Such machine learning algorithms adaptively improve their performance as the number of samples available for learning increases. For example, machine learning algorithms may build a mathematical model based on sample data, known as "training data," in order to make predictions or decisions without being explicitly programmed to perform this task. Machine learning algorithms may be used in a wide variety of applications, such as email filtering, and computer vision, for example, where it is infeasible to develop an algorithm of specific instructions for performing the task.

Many clients utilize customizable business application software such as Customer Relationship Management (CRM) software. CRM software may be utilized to manage a company's interaction with current and potential customers. CRM software may use data analysis about customers' history with a company to improve business relationships with customers, such as by focusing on customer retention and driving sales growth.

In some implementations, if CRM software is modified in certain ways in order to increase worker productivity, for example, the modifications may only be made by one or more human programmers. However, modifications by one or more human programmers may introduce latencies as it may take some time for the modifications to be correctly programmed and implemented into the CRM software. Moreover, hiring or employing such programmers may be relatively expensive. Additionally, if a human programmer manually modifies or updates CRM software to add or otherwise modify certain features, there is a possibility that the human programmers will erroneously type of entre some of the modification to the CRM software, potentially resulting in malfunctions to the CRM software, for example.

Some large clients may utilize CRM software to generate various business objects within a User Interface. A relatively large client may have 1,000 of more users of the CRM software who regularly utilize the CRM software. For example, salespersons of a company may utilize CRM software, for example, to generate tables or forms relating to a sale of goods and/or services to or from a company. Different users may interact with the CRM software in different ways, such as in user-specific ways. For example, some users may utilize or select certain features, such as drop-down boxes or charts in a User Interface more regularly than other others. However, if CRM software is modified or updated by a human programmer, the human programmer might not appreciate that certain features are used more regularly or are otherwise considered to be more valuable if the human programmer is unaware that certain users place a higher importance on those features, for example.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

One or more embodiments as discussed herein are directed to a system and process for monitoring or analyzing user interaction with business software, such as CRM software, to determine how to improve a user experience. In one embodiment, user interactions may be monitored to determine how to reduce a number of user interactions in the future, so as to improve a user's efficiency in interacting with the business software. For example, if a salesperson often uses the business software to generate a sales order or invoice for a customer who has ordered goods and/or services in the past, the salesperson may spend a certain amount of time repeatedly entering certain information relating to the sale into an electronic business form in the business software, for example. In some implementations, particularly where a customer purchases a lot of different items at once, a salesperson may spend a relatively large amount of time entering at least some of the same information into the electronic business form in the business software each time a sale is made to the customer. However, if the business software had an ability or mechanism for anticipating that the customer was likely to purchase items similar to those which the same customer has purchased in the past, the business software could reduce an amount of time that the salesperson spent entering the same information into the electronic business form my proactively filling out such information for the salesperson, even if the salesperson did not request that the information be filed out automatically for him or her, for example.

Various different clients or entities may utilize business software licensed or purchased from the same software developer. For example, the business software may be tailored to meet the particular needs or requirements of individual clients or entities, such that different clients may be provided with business software which is somewhat different from that produced to the other clients. However, certain aspects may remain the same across all or many of the business software applications provided to the clients. For example, each of the business software applications may include various business objects and a User Interface (UI).

A business object may comprise an entity within a multitiered software application which functions or works in conjunction with data access and business logic layers to transport data, for example. A business object may store or otherwise hold a set of instance variables or properties, also known as attributes, and associations with other business objects, to weave a map of objects representing business relationships, for example. A business object may comprise an actor within a business layer of a layered object-oriented application or computer program that represents a part of a business or an item within it. A business object may represent a data client and may be implemented as an entity bean, a session bean or another business object, for example. A business object may take a form of a data array but may not comprise a database itself. A business object may represent business entities such as an invoice, a customer business data object, a product data object, a sales order, a purchase order, a service request, a transaction, or a person, for example. Business objects may be scalable due to an architecture of object-oriented software applications, for example.

A user of a client may interact with one or more business objects of the business software via a UI. For example, a user may enter certain information into an invoice in a certain order such as entering a type of good being purchased followed by a quantity of the good in the invoice. A user may also interact with certain items such as a drop-down box to select a country of residence after entering the customer's name into the invoice, for example. Other types of business objects with which a user may interact include a user click or selection of a particular button or entry of a certain value, for example.

In one particular example embodiment, defaults may be determined upon creation of new business object instances. For example, a representative may create a new sales order business object instance. If, for example, in a relatively high percentage of prior instance, such as 80% of the past sales order instances, the representative has selected customer "Big Box Store," a determination may be made that it is very likely that the representative will enter the customer name again. A reference to a customer may be realized via a foreign key relationship between the sales order and the customer business objects. Thus, a customer foreign key field of the sales order instance may be defaulted with a key of the customer instance "Big Box Store."

In another embodiment, colleagues within the same sales region may have entered the same account for a sales order in the past and default values may thereafter be determined via machine-learning for the colleagues to utilize while filling out an additional sales order at a subsequent time, for example. Whenever items of data, such as based on user interactions, are created, the data may be analyzed, such as in combination with other data to identify user preferences and/or likely user interactions, for example.

A user's interactions with business software may be monitored and analyzed to determine how to improve the user's experience interacting with the business software. In one embodiment, a user's interactions and the interactions of other users of the same client may be recorded for analysis. For example, the user interactions may be logged or stored in a local database or memory device of the client and the user interactions may subsequently be transmitted to an application server, such as an application server. In one implementation, the application server may comprise an application server deployed on the cloud. An application server may be in communication with both a user and one or more databases, such as a relational database, document database, and/or network database, for example. The user interactions may alternatively, or additionally, be logged at each user's computing device for subsequent transmission to the application server. Logged user interactions may be transmitted, uploaded, or synched to an application server periodically, such as once per day or every six hours, for example. Logged user interactions may sometimes be transmitted an application server when traffic on a local client network is relatively slow. For example, if a relatively large number of users are utilizing a local network's bandwidth at around the same time, local network performance may be adversely affected if user interaction information which has previously been logged is also transmitted to an application server at that same time. Accordingly, local network performance may be improved or optimized by delaying transmission of the logged user interactions to the application server until the local network traffic falls below a threshold amount. In some implementations, logged user interactions may be transmitted to an application server after the end of the work day when local network bandwidth is likely to be higher, for example. In additional implementations, user interactions may continue to be logged locally until an application server transmits a request for such logged user interactions.

As discussed above, there may be various clients who use business software provided by the same company, for example, although the actual business software may vary from client to client. To improve overall system performance, user interaction from different clients may be collected and analyzed to determine how to improve a user experience for one or more users. For example, users at different clients may interact with business objects in a certain way and/or in a certain order even though the clients may not use the exact same business software. For example, a business object comprising an invoice may contain some similar information for different versions of business software and users may interact with the different invoices in a similar manner or in a similar order. Accordingly, if user interactions from users of different clients are collectively analyzed, a wealth of data points or information may therefore be available from which to determine how to enhance a user experience. For example, a user experience may be enhanced or improved by reducing a number of active steps or operations which must be performed by a user to perform one or more tasks via business software, such as the creation of sales invoices. For example, if it can be determined that 20% of all users type in a certain value in a particular field, a user experience may be enhanced by auto-filling that value into the field. For example, for the 20% of users who would have had to manually type that value into the field, those users may now generate an invoice while performing fewer operations. For the other users among the 80% of users who would not have entered that same value, their experience may not be degraded as they may manually modify the value and they would likely have had to manually enter information into that field in any event.

Other data points besides a particular user interaction may also be utilized, such as a language of the user, a place or location, temporal information, and/or weather conditions where the user is located. For example, temporal information such as a particular day on which the user interacts with the system might influence or affect the user's behavior. Similarly, a time of the day, such as early morning versus late evening might also affect the user's behavior. In an embodiment, temporal information and/or a location where a user interaction was performed or observed may be utilized as an input to a machine learning process in order to improve a future user interaction, for example. Location information may indicate whether a user was at home or travelling at a time of a user interaction, for example. In one particular example, if a day is at the end of the week, a user might be more likely to select or enter a certain value than the user would be likely to do if the day is earlier in the week. Additional temporal information such as whether the day of the week is a holiday or occurs during a weekend may be considered. For example, if the day is during the weekend, a user may be more likely to work on some high priority items. Similarly, weather conditions may also be considered such as if it is raining, it might beneficial for a customer to attempt to sell more umbrellas. Such weather condition information may be determined from a weather website, database, and/or application, for example. A machine-learning process may use such information as input data to determine patterns of user interactions, for example.

In accordance with one or more embodiments, an application server may utilize a machine learning approach or process to analyze logged user interactions to deduce or otherwise determine how a user experience may be improved such as by reducing the number of steps a user may have to undertake in order to perform certain tasks, as discussed above. For example, a machine learning process may be utilized to determine that a number of user interactions to perform a task may be reduced by auto-filling certain information into various fields on an electronic document form, such as one for generating an invoice. For example, instance data may be preloaded for a user. For example, if a user accesses a table of business object instances, such as to show all of the user's sales order instances, a determination may be made that a relatively high percentage of users, such as 80% of the users, directly navigate to respective user interface (UI) detail screens. A system may also preload certain data from a database to improve or optimize performance, for example.

A cloud-based database may have sufficient processing capabilities and/or resources to relatively quickly perform a machine learning operation. A machine-learning approach may initially undergo a training process until certain aspect or parameters of a machine-learning learning approach may be determined. For example, a neural network may be utilized to initially train the machine-learning approach on a back-end to identify patterns or determine an expected output. After being initially trained, for example, a machine-learning approach may subsequently be fined-tuned or modified over time based, at least in part, on new user interaction meta data analyzed by the application server, for example. In one particular example, a neural network may be implemented or used by the application server or for the application server to determine how to enhance a user experience such as by guiding a user through completion of an invoice or through interaction with some other business object(s). A machine learning approach may comprise a generic runtime. A generic runtime may, for example, determine a business object.

A CRM system is, for example, built upon metadata. For example, the CRM system may comprise a meta data-driven or model-driven architecture. For a particular use case different metadata may exist. Business object metadata may describe a database schema as well as a behavior of a business object. Create, read, update, and delete (CRUD) source code classes, for example, may be registered on events such as OnUpdate or OnCreate, which may subsequently be executed when, for example, an object instance is updated. Such metadata may be interpreted by a generic runtime. Accordingly, whenever a change to a business object instance occurs, first the generic runtime may handle the analysis and may subsequently determine relevant source code exits and execute them. Such a generic runtime may include a possible feature where other generic feature may be plugged in, such as for tracking changes of a certain business object and using such changes later on by a machine learning mechanism. Besides business objects, user interfaces (UIs) may also be modelled, such that the UIs are defined by metadata. An interpreter/generic UI runtime for such metadata may exist which may generically handle user interactions. For example, when a user hits a button with a semantic create operation, a new business object instance may be created by a UI runtime by calling a CRUD operation on the generic business object runtime for a certain business object, such as a sales order creation button, for example. As with a business object generic runtime, a UI runtime may track user interactions generically for latter machine learning usage, for example.

In some embodiments, a machine-learning approach may be limited, such as for privacy reasons. For example, if a user is assigned to a geographical sales location which is limited to Central or Eastern European countries, such as Germany, Poland, and/or Austria, user experience meta data determined from user interactions with selling goods or services to a Western European country such as the United Kingdom or Ireland may be excluded from consideration for example.

In some implementations, a user may interact with business software differently when the user is in an offline mode, e.g., without network access, then the user may interact while in an online mode, e.g., with network access. Accordingly, logged user interactions may also log whether the user was in an online mode or in an offline mode when the user interactions were logged, for example.

In accordance with an embodiment, the logged user interactions may be stored as meta data, for example. One or more eXtensible Markup Language (XML) files comprising the meta data may be transmitted to the application server for processing, for example.

Figure 1:
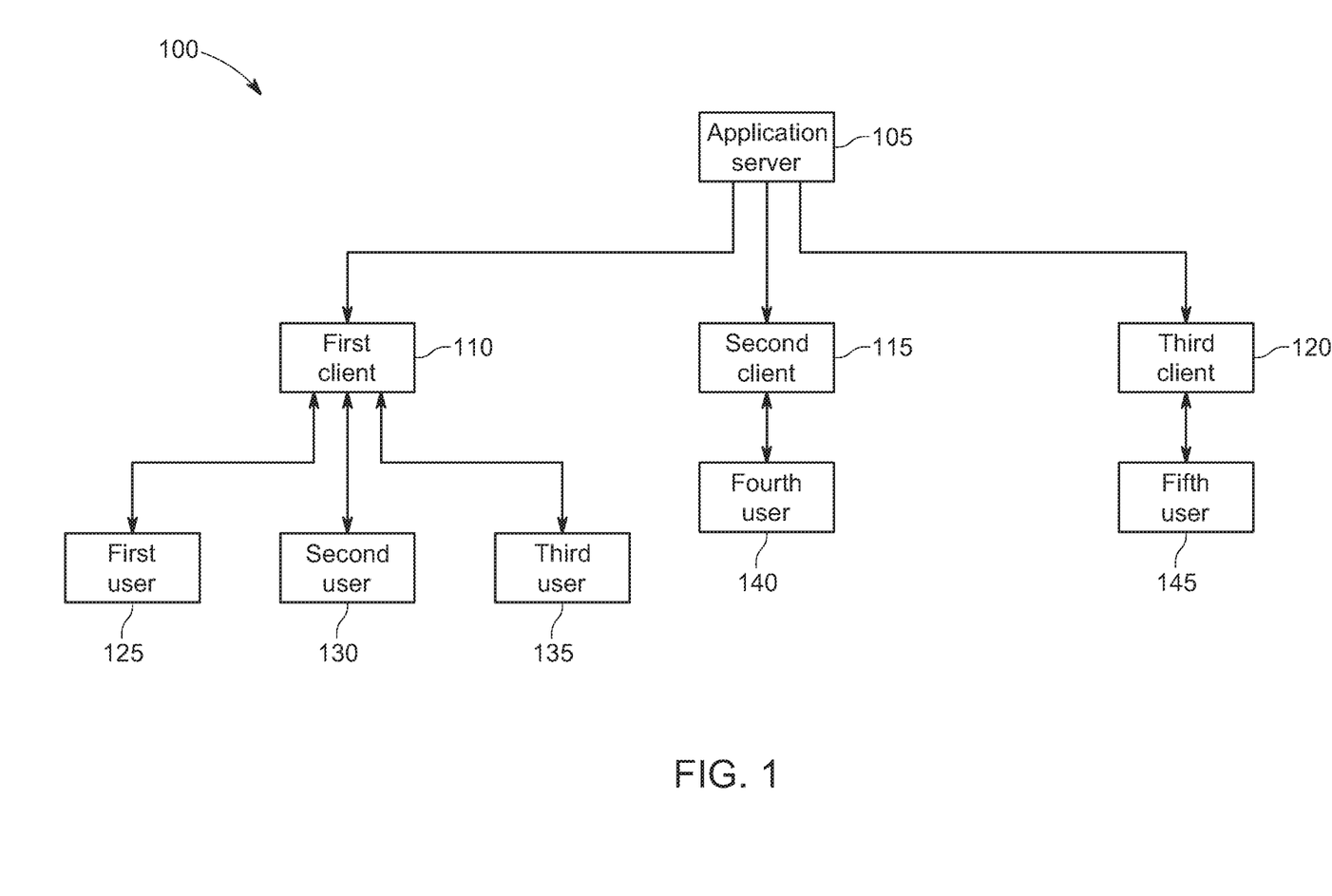
FIG. 1 illustrates an embodiment of a system for enhancing a user experience of users of business software.

FIG. 1 illustrates an embodiment 100 of a system for enhancing a user experience of users of business software. As shown, embodiment 100 may include an application server 105. Although only one application server 105 is shown in FIG. 1, it should be appreciated that more than one application server 105 may be utilized in some implementations. Moreover, application server 105 may comprise a cloud-based application server, for example. Application server 105 may be in communication with one or more clients and one or more databases. A first client 110, a second client 115, and a third client 120 may each utilize business software provided by a particular company. In one particular embodiment, business software may be deployed to the cloud and may be used by multiple different customers, each of which may be associated with multiple users. In other implementations, only interactions for users of a customer itself may be utilized to determined patterns via machine-learning, for example. In other embodiments, user interactions from users of different customers may be utilized to determine certain generic or global patterns via machine-learning. In some embodiments, customer-specific data may be processed to determine certain patterns whereas for certain technical items of data may be processed to determine certain patterns across customers.

As discussed above, each of the clients may utilize different versions of the business software, although there may be some similarities across the versions of the business software, such as common use of certain types of business objects within a UI. Only three clients are shown for the sake of simplicity, although it should be appreciated that more than three clients may be utilized in some implementations, such as thousands of clients. Each client may include one or more users. For example, first client 110 is shown as being associated with a first user 125, a second user 130, and a third user 135. Similarly, second client 115 may be associated with a fourth user 140 and third client 120 may be associated with a fifth user 145. Only five users are shown for the sake of simplicity, although it should be appreciated that in some implementations, more than five users may utilize the business software, such as potentially tens of thousands of users. Moreover, although second client 115 and third client 120 are illustrated as each only being associated with a single user, FIG. 1 has been drawn this way for the sake of simplicity and it should be appreciated that each client may be associated with potentially hundreds or thousands of users, for example.

Figure 2:
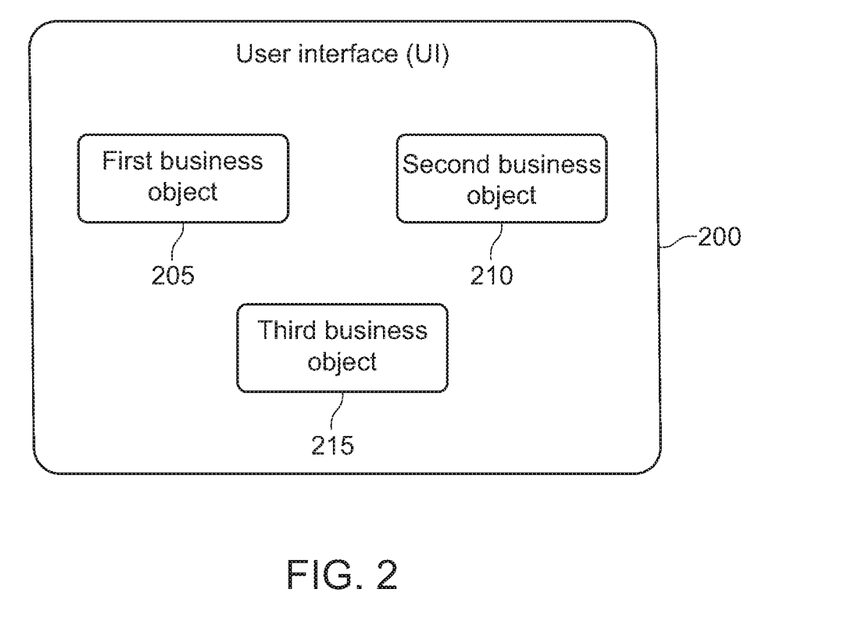
FIG. 2 illustrates a User Interface (UI) according to an embodiment. For example, a client's business software may render UI.

FIG. 2 illustrates a User Interface (UI) 200 according to an embodiment. For example, a client's business software may render UI 200. UI 200 may display or present various business objects, such as a first business object 205, a second business object 210, and a third business object 215. Although only three business objects are shown within UI 200, it should be appreciated that in some implementations a relatively large number of business objects may be displayed or presented within a UI 200, such as potentially hundreds of business objects, for example. A business object may represent business entities such as an invoice, a transaction, or a person, for example, such as previously discussed above, for example.

Figure 3:
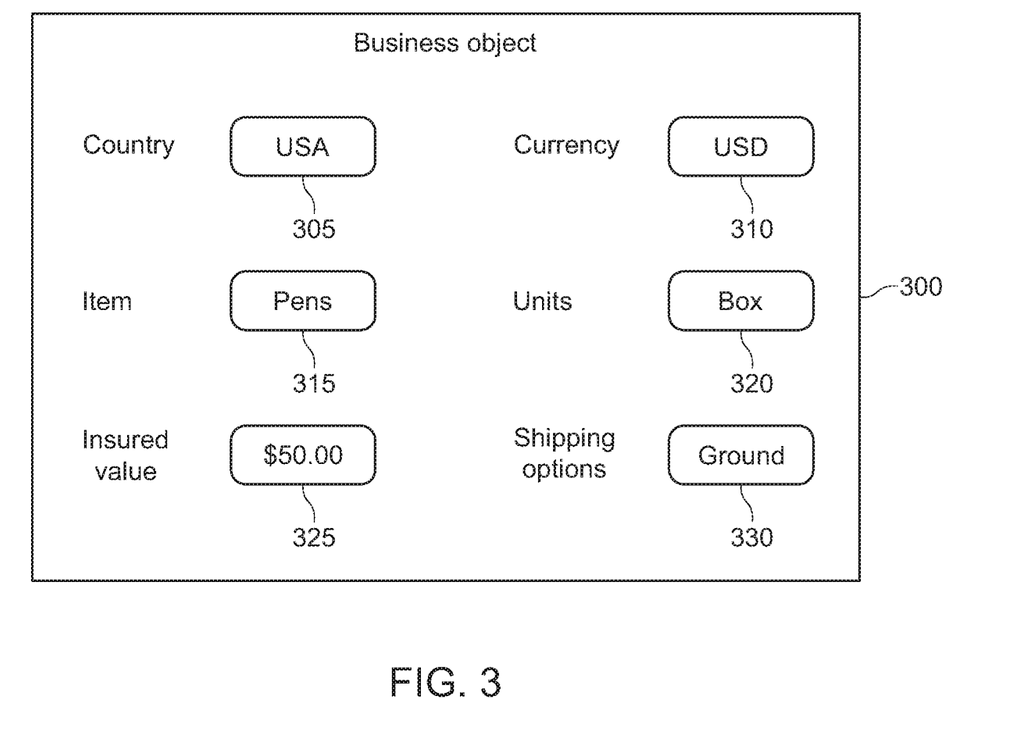
FIG. 3 illustrates a business object according to an embodiment.

FIG. 3 illustrates a business object 300 according to an embodiment. As shown, business object may include several drop-down boxes into which a user may select certain values such as for generation of a client invoice, for example. Business object 300 may include various portions or fields into which a user may submit or otherwise provide information. For example, as shown, business object 300 includes various drop-down boxes. As illustrated, business object 300 may include a first drop-down box 305 from which a user may select a country code such USA for United States, FRA for France, DEU for Germany, and so forth. A second drop-down box 310 may be utilized by a user to a currency code such as USD for U.S. Dollars, EUR for Euros, or JPY for Japanese Yen, to name just a few examples. A third drop-down box 315 may be utilized by a user to select a code for an item being sold or transacted, such as pens, paper, desks, chairs, or any other items for sale, for example. In some embodiments, a drop-down box for a service may be included instead of or in addition to the third drop-down box 315 for the item being sold or transacted, for example.

A fourth drop-down box 320 may be utilized by a user to select a unit by which the item is being sold, such as box, case, pound, number, etc. A fifth drop-down box 325 may be utilized by a user to select an insured value for the item being sold or transacted, such as $50.00, $100.00, or $500.00, to name just a few examples among many. A sixth drop-down box 330 may be utilized to select a shipping option such as ground shipping or air mail, for example. Although only six drop-down boxes are shown in FIG. 3, it should be appreciated that more, or fewer, drop-down boxes may be included in an electronic form document in accordance with some embodiments. Moreover, certain other extension fields may be considered, such as where a customer may add a customized field to a UI, such as a quantity or identifier, for example. Moreover, a business object 300 may also include various additional portions where a user may manually enter certain information, such as without use of a drop-down box. For example, in some implementations, information such as a name and/or address of a client may comprise information which may be manually entered or otherwise provided by a user instead of being selected via a use of a drop-down box.

A user may interact with the various drop-down boxes shown of business object 300 in a particular way. For example, if the user typically sells items to German clients the user may typically set the first drop-down box 305 to a value of DEU for Germany. If many of the other clients of a business software application also typically sell goods or services to German customers, for example, many of the users of the business software may also set the first drop-down box 305 to a value of DEU for Germany. A machine-learning approach may determine that a value of DEU for Germany is the most likely selection for the first drop-down box 305 and may proactively set the first drop-down box 305 to a value of DEU, for example, to enhance a user experience.

Figure 4:
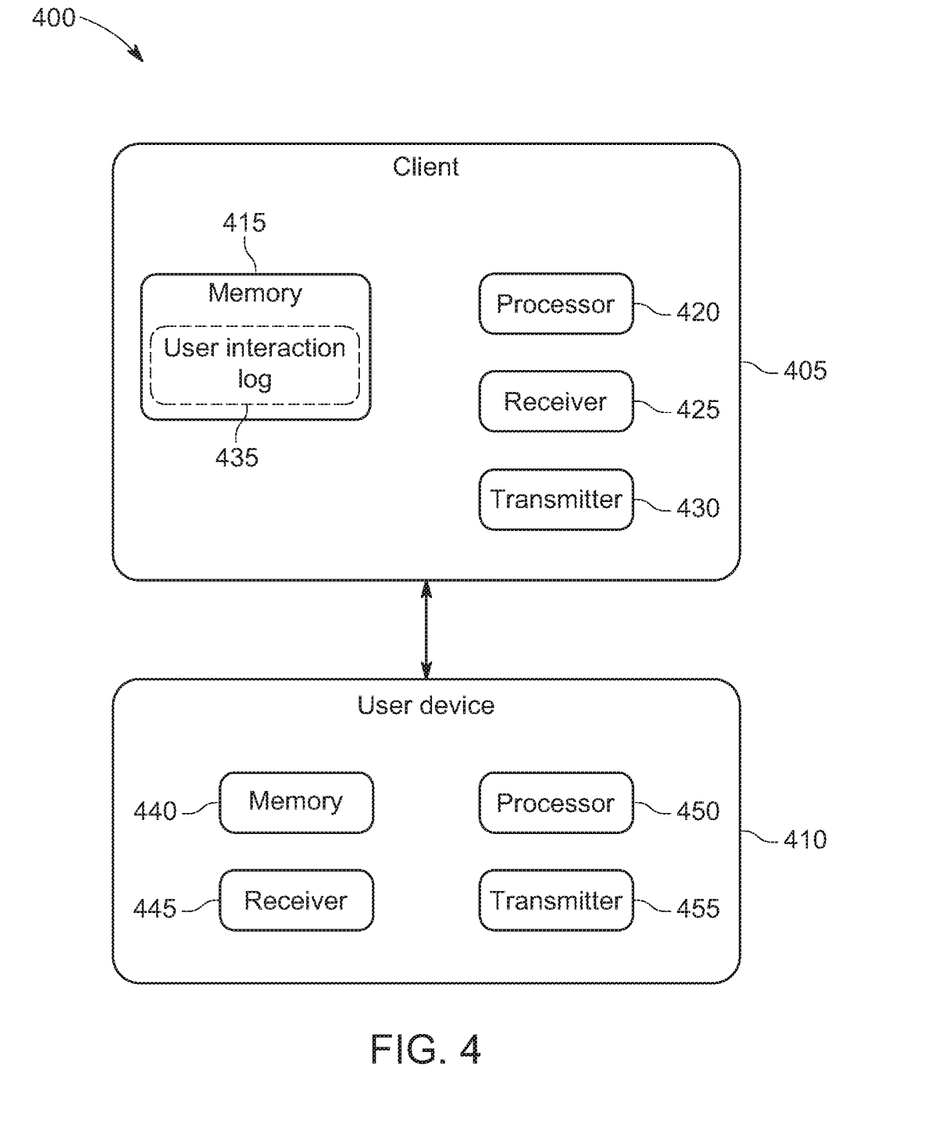
FIG. 4 illustrates an embodiment of a client and a user device.

FIG. 4 illustrates an embodiment 400 of a client 405 and a user device 410. As shown, client 405 may include a memory 415, a processor 420, a receiver 425, and a transmitter 430. A user interaction log 435 may be stored within memory 415. Processor 420 may execute instructions or code stored in memory 415. Receiver 425 may receive meta data from user device 410 indicative of a user interaction with one or more business objects of a UI, for example. Transmitter 430 may transmit meta data in the user interaction log 435 to an application server, periodically, intermittently, and/or in response to a request form the application server, for example. As discussed above, the meta data may be transmitted via one or more XML files, for example.

User device 410 may include a memory 440, a processor 445, a receiver 450, and a transmitter 455, to name just a few items among many. For example, processor 445 may execute instructions or code stored in memory 440. Transmitter 455 may transmit meta data to client 405 indicative of a user interaction with one or more business objects of a UI, for example. Receiver 450 may receive a request from client 405 for meta data determined from a user's interactions with one or more business objects of an UI, for example.

Figure 5:
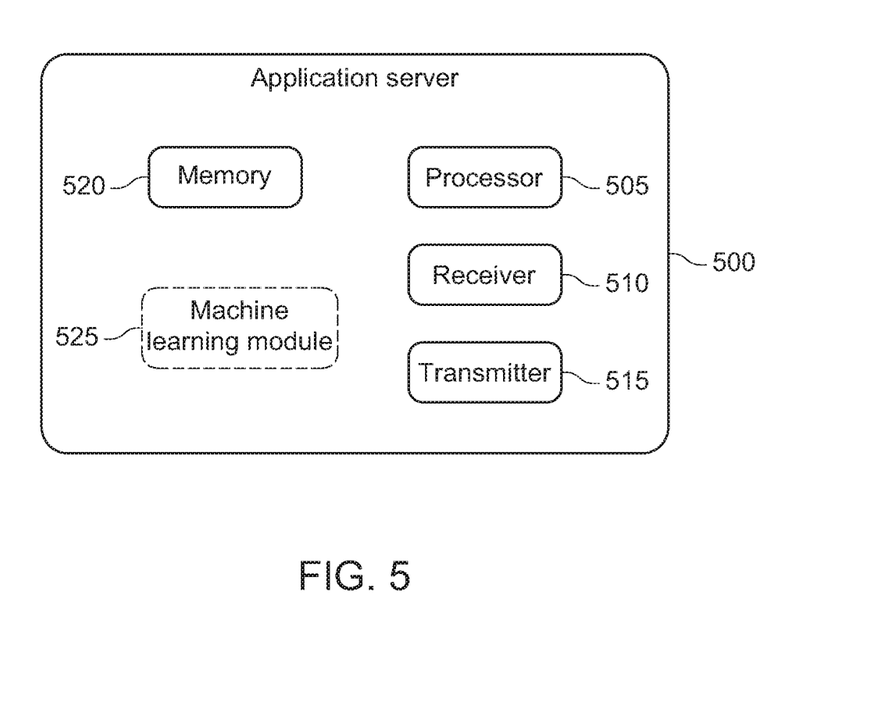
FIG. 5 illustrates an application server according to an embodiment.

FIG. 5 illustrates an application server 500 according to an embodiment. As discussed above, although only one database is illustrated, it should be appreciated that application server 500 may comprise one or more cloud-based application servers, for example. Application server 500 may include a processor 505, a receiver 510, a transmitter 515, and a memory 520 to name just a few items among many. For example, processor 505 may execute instructions or code stored in memory 520. In accordance with an embodiment, processor 505 may execute instructions or code stored in memory 520 to generate or implement a machine learning module 525, for example. Receiver 510 may transmit meta data, such as via one or more XML files, from one or more clients, where the meta data is indicative of user interactions with one or more business objects of a UI, for example. Transmitter 515 may transmit a request to one or more clients for meta data indicative of user interactions, for example. Received meta data, such as via one or more XML files, may be stored in memory 520 for processing and/or analysis, for example.

Machine learning module 525 may deduce or otherwise determine how to improve a user experience based on an analysis of meta data indicative to user interactions with business objects of a UI, for example. If machine learning module 525 determines how to enhance or otherwise improve a user experience, machine learning module may determine how to modify one or more business objects and/or create one or more new business objects, for example. After determining how to modify and/or create one or more business objects, information such as meta data indicative of such changes may be transmitted from application server 500 to one or more clients, for example.

Figure 6:
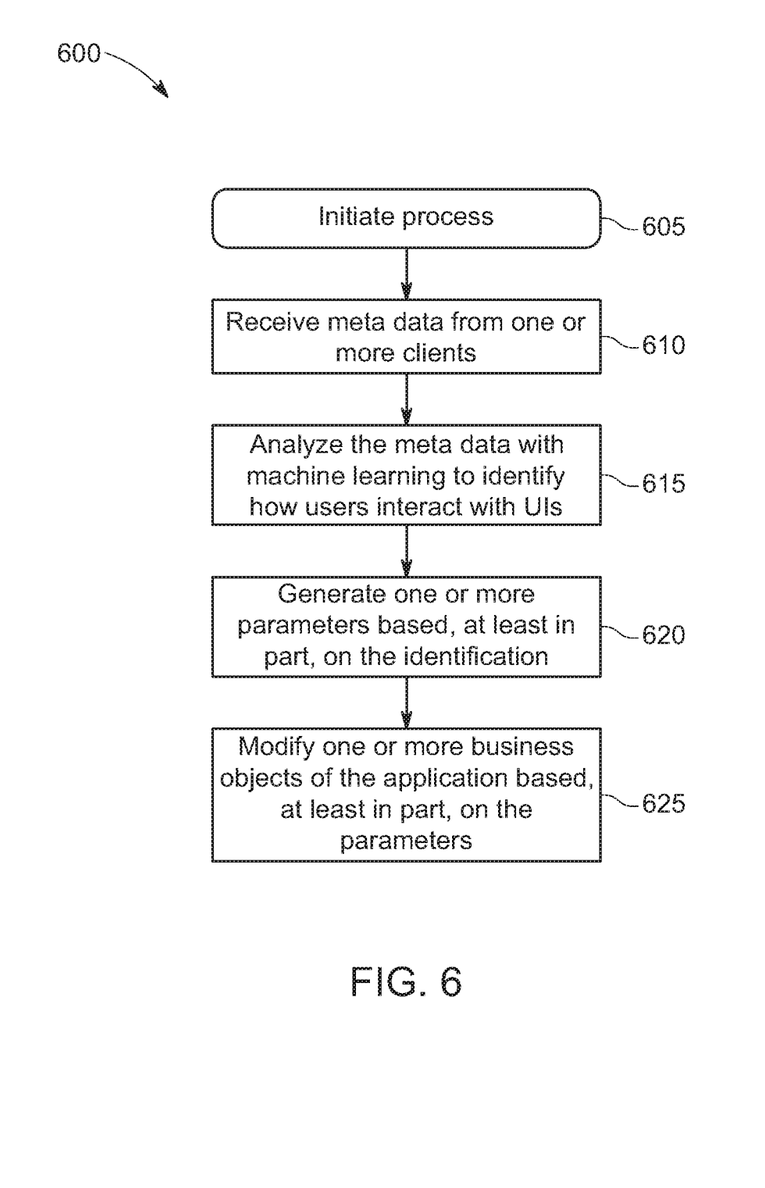
FIG. 6 illustrates an embodiment of a process for determining how to enhance a user experience based, at least in part, on user interactions with one or more business objects of a UI.

FIG. 6 illustrates an embodiment 600 of a process for determining how to enhance a user experience based, at least in part, on user interactions with one or more business objects of a UI. Embodiments in accordance with claimed subject matter may include all of, less than, or more than blocks 605 through 625. Also, the order of blocks 605 through 625 is merely an example order. At operation 605, process may be initiated. At operation 610, meta data may be received from one or more clients. For example, the meta data may indicate user interactions with one or more UIs of an application. At operation 615, the meta data may be analyzed with machine learning to identify how users of the one or more clients interact with the UIs of the application. At operation 620, one or more parameters may be generated based, at least in part, on the identification of how the users of the one or more clients interact with the UIs of the application. At operation 625, one or more business objects of the application may be modified based, at least in part, on the parameters to reduce user interactions with the one or more UIs, for example.

Some portions of the detailed description are presented herein in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

It should be understood that for ease of description, a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), a storage area network (SAN), and/or other forms of computing and/or device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as computing and/or communication protocols (e.g., network protocols), may interoperate within a larger network. In this context, the term sub-network and/or similar terms, if used, for example, with respect to a network, refers to the network and/or a part thereof. Sub-networks may also comprise links, such as physical links, connecting and/or coupling nodes, such as to be capable to transmit signal packets and/or frames between devices of particular nodes, including wired links, wireless links, or combinations thereof. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices of a node, but without the communicating devices necessarily specifying one or more intermediate devices of one or more nodes and/or may include communicating as if intermediate devices of intermediate nodes are not necessarily involved in communication transmissions. For example, a router may provide a link and/or connection between otherwise separate and/or independent LANs. In this context, a private network refers to a particular, limited set of network devices able to communicate with other network devices in the particular, limited set, such as via signal packet and/or frame transmissions, for example, without a need for re-routing and/or redirecting transmissions. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame transmissions may employ intermediate devices of intermediate nodes to exchange signal packet and/or frame transmissions, those intermediate devices may not necessarily be included in the private network by not being a source or destination for one or more signal packet and/or frame transmissions, for example. It is understood in this context that a private network may provide outgoing network communications to devices not in the private network, but devices outside the private network may not necessarily be able to direct inbound network communications to devices included in the private network.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof

What is claimed is:

1. A method, comprising:
  receiving meta data from two or more clients, the meta data indicating at least user interactions with one or more user interfaces (UIs) of an application and at least an indication of whether a particular user was at a home location or at an away location when the user interactions for the particular user were obtained;
  analyzing the meta data with machine learning to identify how users of the two or more clients interact with the UIs of the application;
  generating one or more parameters based, at least in part, on the identification of how the users of the first client of the two or more clients interact with the UIs of the application, and the at least the indication of whether the particular user was at the home location or at the away location when the user interactions for the particular user were obtained; and
  modifying one or more objects of the application based, at least in part, on the parameters to reduce user interactions of the users of the first client with the one or more UIs, wherein the modifying comprises auto-filling information into one or more fields of the one or more UIs based on the parameters.

2. The method of claim 1, wherein the meta data is logged at the two or more clients and received periodically.

3. The method of claim 1, wherein the meta data is logged at the two or more clients and received intermittently.

4. The method of claim 1, wherein the user interactions comprise one or more user selections of one of more objects within the UIs.

5. The method of claim 1, wherein the modification of the one or more objects comprises combining a first object with a second object.

6. The method of claim 1, wherein the meta data is received at an application server.

7. The method of claim 6, wherein the application server is cloud-based.

8. The method of claim 1, wherein
  the meta data further indicates at least one of a date on which a user interaction occurred, a time of day on which the user interaction occurred, a geographical location at which a user associated with the user interaction was located when the user interaction occurred, or weather conditions corresponding to the geographical location at which the user associated with the user interaction was located when the user interactions occurred; and
  the generation of the one or more parameters is further based, at least in part, on the at least one of a date on which a user interaction occurred, a time of day on which the user interaction occurred, a geographical location at which a user associated with a user interaction was located when the user interaction occurred, or weather conditions corresponding to the geographical location at which the user associated with the user interaction was located when the user interactions occurred.

9. An apparatus, comprising:
  a receiver to receive one or more electronic signals from one or more clients;
  a transmitter to transmit the one or more electronic signals to the one or more clients;
  a memory;
  a processor to:
    receive user interaction data from two or more clients, the user interaction data indicating user interactions with one or more user interfaces (UIs) of an application and at least an indication of whether a particular user was at a home location or at an away location when the user interactions for the particular user were obtained;
    analyze the user interaction data with machine learning to identify how users of the two or more clients interact with the UIs of the application;
    generate one or more parameters based, at least in part, on the identification of how the users of the first client of the two or more clients interact with the UIs of the application, and the at least the indication of whether the particular user was at the home location or at the away location when the user interactions for the particular user were obtained; and modify one or more objects of the application based, at least in part, on the parameters to reduce user interactions of the users of the first client with the one or more UIs, wherein the modifying comprises auto-filling information into one or more fields of the one or more UIs based on the parameters.

10. The apparatus of claim 9, wherein the user interaction data is logged at the two or more clients and received periodically.

11. The apparatus of claim 9, wherein the user interaction data is logged at the two or more clients and received intermittently.

12. The apparatus of claim 9, wherein the user interactions comprise one or more user selections of one of more objects within the UIs.

13. The apparatus of claim 9, wherein the modification of the one or more objects comprises combining a first object with a second object.

14. The apparatus of claim 9, wherein the meta data further indicates at least one of a date on which a user interaction occurred, a time of day on which the user interaction occurred, a geographical location at which a user associated with the user interaction was located when the user interaction occurred, or weather conditions corresponding to the geographical location at which the user associated with the user interaction was located when the user interactions occurred; and the generation of the one or more parameters is further based, at least in part, on the at least one of a date on which a user interaction occurred, a time of day on which the user interaction occurred, a geographical location at which a user associated with a user interaction was located when the user interaction occurred, or weather conditions corresponding to the geographical location at which the user associated with the user interaction was located when the user interactions occurred.

15. An article, comprising:

a non-transitory storage medium comprising machine-readable instructions executable by a special purpose apparatus to:

receive meta data from two or more clients, the meta data indicating user interactions with one or more user interfaces (UIs) of an application and at least an indication of whether a particular user was at a home location or at an away location when the user interactions for the particular user were obtained;

analyze the meta data with machine learning to identify how users of the first client of the two or more clients interact with the UIs of the application;

generate one or more parameters based, at least in part, on the identification of how the users of the two or more clients interact with the UIs of the application, and the at least the indication of whether the particular user was at the home location or at the away location when the user interactions for the particular user were obtained; and modify one or more objects of the application based, at least in part, on the parameters to reduce user interactions of the users of the first client with the one or more UIs, wherein the modifying comprises auto-filling information into one or more fields of the one or more UIs based on the parameters.

16. The article of claim 15, wherein the user interaction data is logged at the two or more clients and received periodically.

17. The article of claim 15, wherein the user interaction data is logged at the two or more clients and received intermittently.

18. The article of claim 15, wherein the user interactions comprise one or more user selections of one of more objects within the UIs.

19. The article of claim 15, wherein the modification of the one or more objects comprises combining a first object with a second object.

20. The article of claim 15, wherein the meta data further indicates at least one of a date on which a user interaction occurred, a time of day on which the user interaction occurred, a geographical location at which a user associated with the user interaction was located when the user interaction occurred, or weather conditions corresponding to the geographical location at which the user associated with the user interaction was located when the user interactions occurred; and the generation of the one or more parameters is further based, at least in part, on the at least one of a date on which a user interaction occurred, a time of day on which the user interaction occurred, a geographical location at which a user associated with a user interaction was located when the user interaction occurred, or weather conditions corresponding to the geographical location at which the user associated with the user interaction was located when the user interactions occurred.

* * * * *